(12) United States Patent
Smits et al.

(10) Patent No.: US 6,631,444 B2
(45) Date of Patent: Oct. 7, 2003

(54) CACHE ARCHITECTURE FOR PIPELINED OPERATION WITH ON-DIE PROCESSOR

(75) Inventors: Kenneth R. Smits, San Ramon, CA (US); Bharat Bhushan, Cupertino, CA (US); Mahadevamurty Nemani, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 09/894,513

(22) Filed: Jun. 27, 2001

(65) Prior Publication Data

US 2003/0005224 A1 Jan. 2, 2003

(51) Int. Cl.[7] .............................................. G06F 12/08
(52) U.S. Cl. ...................... 711/118; 711/169; 711/167; 711/140; 365/51
(58) Field of Search ............................. 711/169, 118, 711/167, 140; 365/51

(56) References Cited

U.S. PATENT DOCUMENTS

| 4,725,945 | A | | 2/1988 | Kronstadt et al. | |
|---|---|---|---|---|---|
| 5,752,260 | A | | 5/1998 | Liu | 711/129 |
| 5,818,785 | A | | 10/1998 | Ohshima | 365/230 |
| 5,883,814 | A | | 3/1999 | Luk et al. | 364/491 |
| 5,893,151 | A | * | 4/1999 | Merchant | 711/140 |
| 6,115,795 | A | | 9/2000 | Gilda et al. | 711/141 |
| 6,185,146 | B1 | | 2/2001 | Shioyama et al. | |
| 2002/0138700 | A1 | * | 9/2002 | Holmberg | 711/137 |

OTHER PUBLICATIONS

Richard C. Murphy and Peter M. Kogge, "Trading Bandwidth for Latency: Managing Continuations through a Carpet Bag Cache", Copyright 2002, IEEE Computer Society, Abstract.*

* cited by examiner

*Primary Examiner*—Matthew Kim
*Assistant Examiner*—Midys Inoa
(74) *Attorney, Agent, or Firm*—Blakely, Sokoloff, Taylor & Zafman LLP

(57) ABSTRACT

Architecture for a cache fabricated on a die with a processor including a plurality of cache banks, each containing a plurality of storage cell subarrays, the cache banks being arranged in physical relationship to a central location on the die that provides a point for information transfer between the processor and the cache. A data path provides synchronous transmission of data to/from the cache banks such that data requested by the processor in a given clock cycle is received at the central location a predetermined number of clock cycles later regardless of which cache bank in the cache the data is stored.

23 Claims, 4 Drawing Sheets

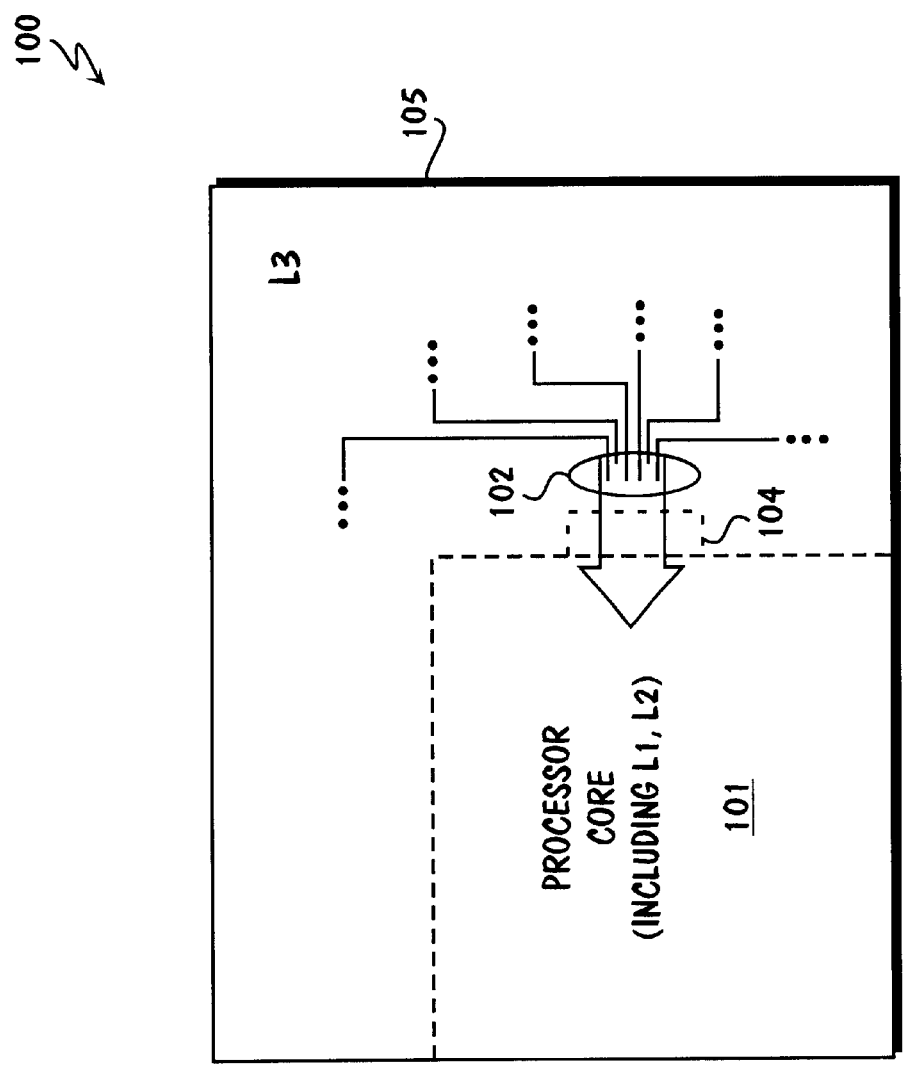

CACHE ARCHITECTURE FOR PIPELINED OPERATION WITH ON-DIE PROCESSOR

RELATED APPLICATIONS

This application is related to Ser. No. 09/894,638 filed Jun. 27, 2001, entitled "CACHE ARCHITECTURE WITH REDUNDANT SUB ARRAY" and Ser. No. 09/893,779 filed Jun. 27, 2001, entitled "ON-DIE CACHE MEMORY WITH REPEATERS", both of which are assigned to the assignee of the present application.

FIELD OF THE INVENTION

The present invention relates generally to the field of very large-scale integrated circuits fabricated on a single semiconductor die or chip. More particularly, the invention relates to the field of high-performance cache memories.

BACKGROUND OF THE INVENTION

Cache memories have been used to maximize processor performance, while maintaining reasonable system costs, for many years. A cache memory is a very fast buffer comprising an array of local storage cells that is used by a processor to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag".) The tag RAM contains the main memory addresses of code and data stored in the data cache RAM plus additional status bits used by the cache management logic. By way of background, U.S. Pat. No. 6,115,795 discloses a computer system comprising a processor that includes second level cache controller logic for use in conjunction with an external second level cache memory.

Recent advances in semiconductor processing technology have made possible the fabrication of large L2 cache memories on the same die as the processor core. As device and circuit features continue to shrink as the technology improves, researchers have begun proposing designs that integrate a very large (e.g., multiple megabytes) third level (L3) cache memory on the same die as the processor core for improved data processing performance. While such a high level of integration is desirable from the standpoint of achieving high-speed performance, there are still difficulties that must be overcome.

Large on-die cache memories are typically subdivided into multiple cache memory banks, which are then coupled to a wide (e.g., 32 bytes, 256 bits wide) data bus. For instance, U.S. Pat. Nos. 5,752,260 and 5,818,785 teach interleaved cache memory devices having a plurality of banks consisting of memory cell arrays. In a very large cache memory comprising multiple banks, one problem that arises is the large RC signal delay associated with the long bus lines when driven at a high clock rate (e.g., 1 GHz). Thus, there is a need for some sort of repeater device to connect each bank of cache memory to the data bus without loss of signal integrity.

One traditional method for sharing a bus is to have each circuit utilize a tri-state driver in order to connect to the bus. Tri-state driver devices are well known in the prior art. A conventional tri-state driver comprises two transistor devices coupled in series to pull the output to either a high or low logic level. The third output state is a high impedance (i.e., inactive) state.

When a tri-state driver is utilized to connect to a bus, the two series-connected output devices of the driver need to be large so as to provide adequate drive strength to the long bus wire. This requirement, however, makes it difficult to use tri-state drivers as repeaters in a multi-megabyte on-die cache memory because the large source/drain diode of the output devices adds considerable load to the bus. The additional load attributable to the tri-state drivers increases bus power and causes significant resistive/capacitive (RC) signal delay. Another drawback of using tri-state drivers as repeaters is the need for decoding circuitry for the drivers. This decoding circuitry is in addition to the decoding circuitry already required for the cache memory banks.

The requirement of sharing the data bus between banks in a large cache memory also creates timing difficulties. The subarrays within a bank may be placed close enough such that the individual bits of the bus will have about the same timing. However, the cache banks themselves are often located at various physical distances from the receiver or central location on the die that provides a point for information transfer to the processor core. This means that the relative signal timing of data to/from each bank may be very different.

For example, one bank may be located far from the core (or some central location on the die that provides a point for information transfer between the processor and the cache) whereas another bank may be located adjacent to the core. The farther bank would incur a significant signal delay due to the RC nature of the metal lines whereas the nearer bank would not. In other words, some data bits travel a long distance and have a long delay, while other data bits travel a short distance and have a short delay to reach the receiver. At high processor speeds and with very large cache sizes, it can take one or more clock cycles for the bits that are farthest away to arrive at the receiver relative to the bits that are closest. That is, even though data is sent/received synchronously with the clock, the RC delay of the long metal lines prevents the data signals from traversing the distance between a bank and the core in a single clock cycle.

Therefore, what is needed is a solution to the synchronization and timing problems inherent in the design of a very large, on-die cache memory operating with a high-speed processor core.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

FIG. 5 is an example of a chip floorplan for a processor that includes an on-die L3 cache.

DETAILED DESCRIPTION

Architecture for a cache fabricated on a die with a processor is described. In the following description, numerous details are set forth, such as specific circuit configurations, logic device types, numerical values, etc., in order to provide a thorough understanding of the invention. It will be clear, however, to one skilled in the art, that these specific details may not be needed to practice the present invention.

In typical cache memory storage arrays that are organized into banks, when one bank is active, it drives a data bus. All of the bit signal lines of the data bus are usually received at some central location on the die. From there the information is transmitted to the processor core. (In the context of the present application, the term "central location" is intended to have a broad meaning. The term may be construed to include the processor core itself, a receiver device, a set of buffers or latches, or simply a point on the die where the signal lines are coupled to the core. Additionally, the term "central location" is not limited to any particular area, such as the center, of the die; for example, it may refer to a set of connections or points distributed along the periphery of a circuit or region of the core.)

Because of the high frequencies that signals are driven at, and the thinner metal traces that are printed on the die using modern processing techniques, there is a need to repeat or rejuvenate the signal every so often. For example, in state-of-the-art semiconductor processing technology a transmitted signal usually needs to be repeated every 1500 microns or so of metal trace. Without some means of rejuvenating or repeating the signal, the RC delay associated with a long bus line operating at high frequency would result in loss of data.

According to one embodiment of the present invention, each bit of the cache memory bank is connected to a repeater that comprises logic that overcomes the drawbacks associated with the conventional use of tri-state buffers. In one particular implementation, the repeater comprises a single logic gate that drives an inverter. If a bank in the memory is unselected, its output is precharged so that it does not drive the bus. In this manner, when the bank connected to the logic gate is selected, the data stored in the cache array is transmitted through the combinatorial logic structure.

Figure 1:
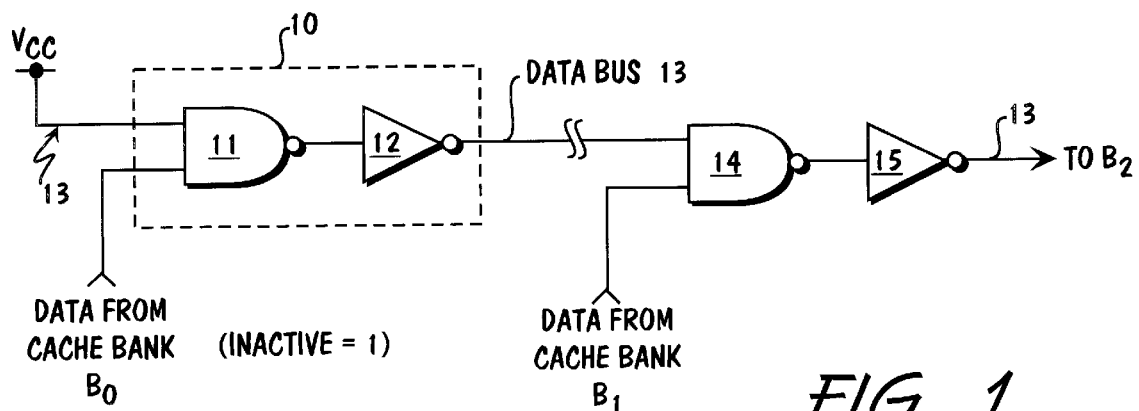
FIG. 1 is a logic diagram of a repeater circuit utilized in one embodiment of the present invention.

With reference to FIG. 1, there is shown a circuit diagram in which repeater 10 is connected in series with data bus 13. Repeater 10 comprises a 2-input NAND gate 11 having an output connected to the input of an inverter 12. One of the inputs of gate 11 is coupled to data bus 13, and the other input is coupled to receive data output from the subarray of an associated cache bank (in this example bank $B_0$). The output of inverter 12 drives data bus 13, which, in this example, is shown connected to another repeater comprising NAND gate 14 and inverter 15, both associated with a corresponding subarray of bank $B_1$.

The use of the repeater structure shown in FIG. 1 implies certain conventions be adopted in the cache memory architecture. One convention is that if the cache bank is unselected (i.e., inactive), the data output from the cache bank is held precharged (high). In the example of FIG. 1, the precharged state is a logical high potential (=1). A logical high potential at one input of NAND gate 11 means that repeater 10 will allow whatever signal is present on data bus 13 to pass through the repeater structure unaltered. That is, data driven from any other cache bank in the memory is unaffected by an inactive cache bank. In this way, repeaters may be concatenated together along a data bus line, with individual repeaters being associated with corresponding subarrays of each bank of cache memory storage.

Practitioners familiar with the data storage arts will also appreciate that the repeater structure of FIG. 1 obviates the need for additional enable logic or enable pulses. This is made possible, in part, by the convention of precharging the output of the cache bank when the bank is inactive, and also by assigning a default logic value to the data bus itself. Note that in FIG. 1, data bus line 13 is initially coupled to a logical high potential (e.g., $V_{CC}$). In other words, the first segment of data bus 13 that is provided as one of the inputs to NAND gate 11 of the first cache bank ($B_0$) is driven by the positive supply potential of the integrated circuit. Thus, a logical high potential is the default value assigned to the data bus in the cache memory architecture of the embodiment of FIG. 1.

All together, the combinatorial logic gate structure of repeater 10 and the convention of precharging the cache data output and assigning a default logic potential to the bus lines allows data to simply flow from cache bank to processor core, without concern about set-up and hold times. For instance, in the case where the data output from an active cache bank is a logical 1, it is already valid by the existing bus line state. The state of data bus line 13 only changes if the data value output from a given cache bank is a logical 0, in which case there is a propagation delay through all of the repeaters associated with each of the banks before the data on the bus becomes valid.

It should be understood that there is no precharging of the data bus line itself; that is, there is no switching or clocking applied to the data bus. A scheme in which the data bus is switched or clocked periodically would require some sort of dynamic driver design, adding complexity, power, and cost. Instead, the repeater structure of FIG. 1 may be advantageously implemented with simple combinatorial logic.

Another important advantage of the repeater structure shown in FIG. 1 is that the NAND logic gate 11 may be made relatively small, with the inverter 12 made relatively large to drive the next segment of the bus. This circuit construction has the benefit of providing increased speed and reduced power so that no additional repeaters are needed before the bus line reaches the next data bank in the cache memory.

Practitioners in the art will further appreciate that the approach of the present invention also provides another advantage when redundant subarrays are employed. Each subarray in a block can have its own enable signal that is used to switch the subarray on or off the bus. In this manner, a subarray can be substituted for any other subarray with just the switching of an enable signal, leaving the bus itself unchanged. Hence, the repeater circuit of FIG. 1 permits implementing a redundant subarray scheme without adversely impacting power or speed.

Figure 3:
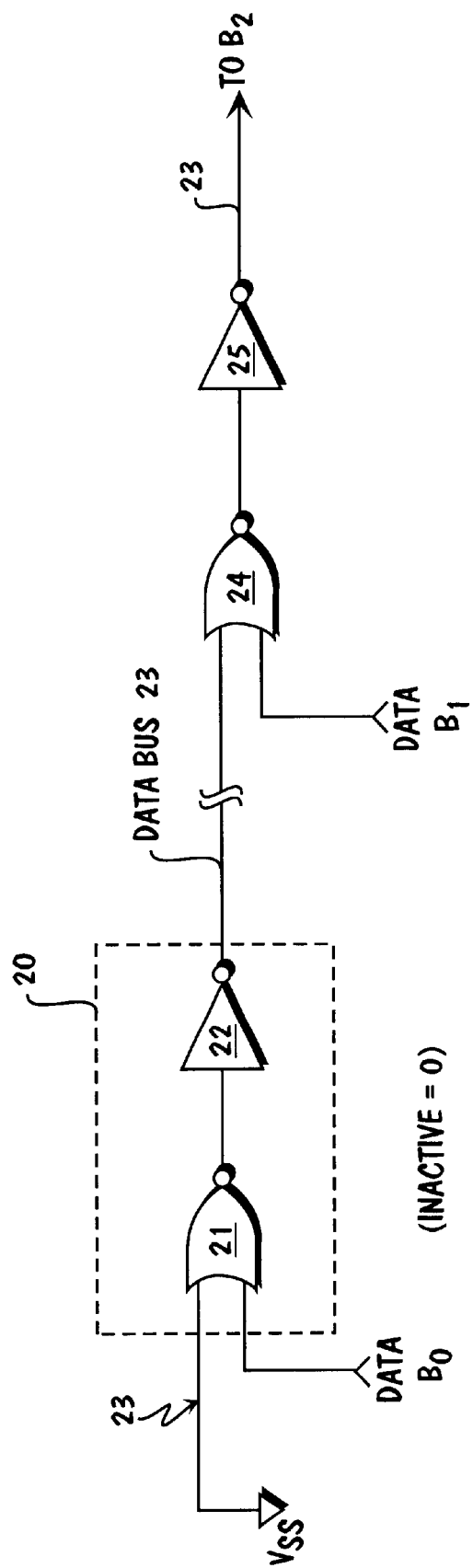
FIG. 3 is a logic diagram of another repeater circuit utilized in a particular embodiment of the present invention.

With reference now to FIG. 3, there is shown an alternative embodiment of the repeater circuit of the present invention. The embodiment of FIG. 3 is essentially the same as that shown in FIG. 1 except that repeater 20 includes a NOR gate 21 instead of a NAND gate as the input logic device. The output of NOR gate 21 is coupled to inverter 22, which, in turn, drives data bus 23. As can be seen, repeater 20 is associated with cache bank $B_0$, and is concatenated in series on the bus with a second repeater (associated with bank $B_1$) comprising NOR gate 24 and inverter 25.

Instead of being precharged to a logical high potential, the data output from all inactive cache banks are precharged to a logical low potential (=0). Also, the default data bus logic level is a logical 0, e.g., $V_{SS}$. Thus, when the data output from an active bank is logically low, the data on the bus is already valid. The only case in which there is a propagation delay through the repeaters before the data on the bus becomes valid is when a cache bank outputs a logical 1. As discussed in connection with FIG. 1, a cache organization implemented using the repeaters shown in FIG. 3 has the advantage of permitting activation of redundant subarray elements with minimal overhead.

Figure 2:
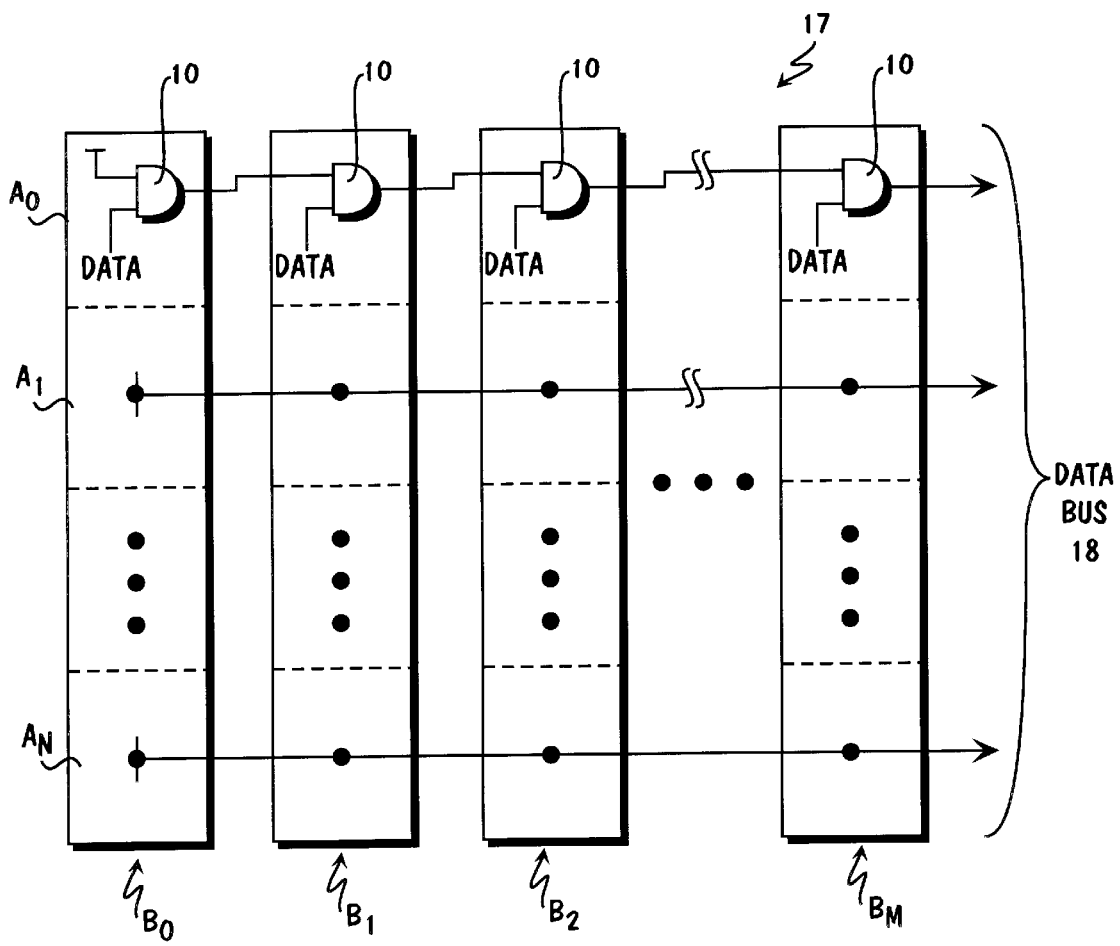
FIG. 2 is a circuit schematic diagram of a cache memory according to one embodiment of the present invention.

FIG. 2 illustrates a cache memory 17 organized into banks $(B_0-B_M)$ with repeaters associated with corresponding subarrays $(A_0-A_N)$ of each bank in accordance to one embodiment of the present invention. By way of example, data from subarray $A_0$ of each bank is selectively connected to one of the lines of bus 18 through repeaters 10. In typical operation, only one of the banks of memory 17 is activated at a time, with the data from the subarrays of that bank being transmitted onto bus 18 exclusively. For instance, bank $B_2$ may be activated (with remaining banks $B_0-B_1$ and $B_3-B_M$ inactive) in order to read data stored subarrays $A_0-A_N$ on bus 18.

It should be appreciated that the repeater structure described above allows cache memory 17 to be easily configurable to any size as spaced allows on the die. Moreover, the solution offered by the present invention may be used on any cache memory. For example, current cache memory designs often use the way hit information to decode individual wordlines internal to the subarray. According to the prior art, if the size of the cache memory is changed and the number of ways changes, then the subarray must be redesigned to accommodate the new number of ways. In contrast, according to the present invention, the way hit may be used to select a bank. If the number of ways is changed, the bank is simply added or removed from the die. This approach is much easier and less disruptive to the die floorplan as compared to prior art schemes, and no edits to the subarrays are required. Accordingly, the specification and drawings are to be regarded in an illustrative rather than a restrictive sense.

With reference now to FIG. 5, there is shown an example floorplan of a chip 100 having a processor core 101 that includes L1 and L2 caches. Also included on chip 100 is an on-die L3 cache 105. The bus lines 102 coupled to the multiple banks of the L3 cache are received at a central location 104 on the die for communication with the processor core 101. (Although the direction of the arrow shown in FIG. 5 denotes information transfer from the banks to the core, it is appreciated that information is likewise transferred in the opposite direction, i.e., from the core to the cache banks.)

In the example of FIG. 5, some banks of L3 cache memory 105 are located relatively close to central location 104, and other banks are located relatively far from central location 104. As previously discussed data timing and synchronization problems arise in the prior art due to the various distances between the banks and central location 104. To overcome these problems, the cache memory architecture of the present invention sends data synchronously along the bus lines such that it arrives at the receiver (e.g., central location 104) at a predetermined time regardless of which bank the data originated from. This is achieved by inserting flip-flops (i.e., "flops"), buffers or latches along the bus in the data path such that data read from the closest banks passes through the same number of flops, and therefore takes the same number of clocks, as data read from the farthest bank. The same scheme is utilized along the input data path for writing data to the cache banks.

Figure 4:
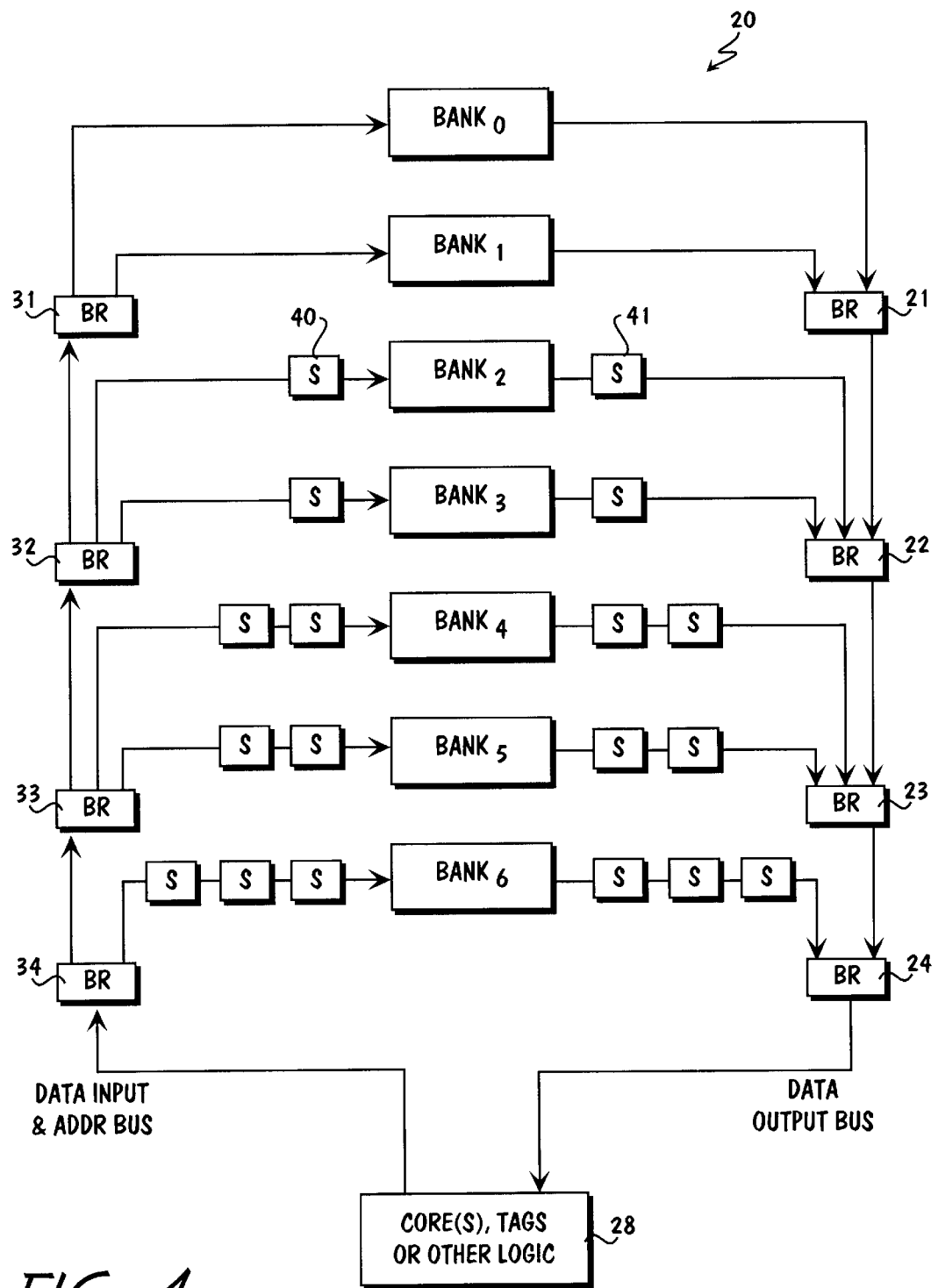
FIG. 4 is a block diagram illustrating one embodiment of the cache architecture of the present invention.

FIG. 4 illustrates an exemplary cache memory 20 organized in accordance with one embodiment of the present invention. Cache memory 20 includes seven cache banks ($Bank_0$–$Bank_6$) each of which is coupled to an input data/address bus and to a data output bus. The input and output buses are both coupled to a block 28, which represents the central location on the chip where information is transferred to/from the processor core. By way of example, block 28 may comprise the tag arrays associated with the cache, the processor core itself, or other logic. Data either originates from or is received by block 28 depending upon the data flow direction.

The spaced-relationship shown between each of the cache banks and block 28 in FIG. 4 is intended to represent the various physical distances that each of the banks are located on the die relative to the central location associated with data transmission from/to the processor core. For example, $Bank_6$ is shown being located closest to block 28, and $Bank_0$ is shown being located farthest from block 28.

The cache memory of FIG. 4 also includes bus repeaters 21–24 inserted in the output data path and bus repeaters 31–34 included in the input data/address path. Each of the bus repeaters is a synchronous device such a clocked flop, buffer, or latch. Bus repeaters are inserted in the data transmission path because a data or address signal can only travel a certain physical or geographic distance along the bus within a given clock cycle. This distance determines the spacing of the bus repeaters along the bus. In other words, bus repeaters are spaced along the bus lines such that a synchronously transmitted signal is received by a next bus repeater (down the line) prior to the next clock cycle. The physical spacing between bus repeaters, therefore, represents the distance a signal can be transmitted on the bus lines in a single clock cycle.

For example, data output from $Bank_0$ must travel the longest distance across the chip and therefore requires the use of bus repeaters 21–24 in order to reach block 28. Stated differently, it takes five clock cycles for signal transmission to/from $Bank_0$. In contrast, $Bank_6$, being the closest bank, only requires the use of bus repeater 24 for output data to reach block 28. To insure that all data arrives and is latched at the central location at a predetermined time regardless of which bank the data is actually stored in, the present invention includes staging devices in the input and output data paths. The blocks labeled "S" (e.g., blocks 40 and 41) in FIG. 4 denote the staging devices. The staging devices may comprise any ordinary synchronous device such a clocked flop, buffer, or latch.

Note that three staging devices are shown inserted in the data path (input and output) coupled to $Bank_6$. In this example, these staging devices are included in order to make the latency associated with $Bank_6$ the same as that associated with the farthest bank, $Bank_0$. By staging data transmission in this manner, synchronization problems inherent in the prior art—such as data accessed from a closer bank colliding on the bus with data from an earlier access to a farther bank—are overcome.

Practitioners in the art will appreciate that the concept of staging provides the further advantage of pipelined data accesses. Because the latency to/from all cache banks is made to be identical in the architecture of the present invention, data accesses can be pipelined, i.e., continuous read and write operations can be performed regardless of which bank the data is actually located. Output data flows back the processor core in the same order it was requested irrespective of the location of the cache bank on the chip where the data is physically stored.

It should be understood that the insertion of the staging devices in the data path for a given bank in the cache is a function of the physical distance of the bank from the central location, and also the operating frequency. For example, more staging devices (and also more bus repeaters) will be needed the faster the operating frequency. Similarly, more staging devices and bus repeaters will be needed the larger the distance between the closest and farthest cache bank.

Whatever the number of staging devices and bus repeaters utilized, the latency or synchronous delay (# of clocks) when accessing any bank in the cache remains constant. In other words, in the cache memory of the present invention a data request to the farthest bank can be immediately followed by a data request to the nearest bank, and the outputs from the respective banks will not collide. The solution of the present invention therefore allows 100% of the bandwidth of the data bus to be utilized. Moreover, it is appreciated that the architecture of the present invention may be used advantageously on non-banked cache memory designs. Accordingly, the specification and drawings are to be regarded in an illustrative rather than a restrictive sense.

We claim:

1. A cache fabricated on a die with the processor, comprising:
    a plurality of cache banks, each containing a plurality of subarrays, the cache banks being arranged in physical relationship to a central location on the die that provides a point for information transfer between the processor and the cache;
    means for synchronously transmitting output data from the cache banks to the central location in a pipelined manner such that data requested by the processor arrives at the central location at a predetermined time regardless of which of the cache banks is accessed to retrieve the data.

2. The cache of claim 1 wherein the means comprises a first data bus to transmit the output data from the cache banks to the central location.

3. The cache of claim 2 wherein the means further comprises a second data bus to transmit input data from the central location to the cache banks.

4. The cache of claim 2 wherein the physical relationship is such that a first cache bank is located a farthest distance from the central location, and a second cache bank is located a nearer distance to the central location.

5. The cache of claim 4 wherein the means further comprises:
    N bus repeaters, where N is an integer greater than or equal to one, each of the N bus repeaters operating synchronous with the processor and being spaced on the first bus such that data accessed from the first cache bank, which is sent on the first bus in a first clock cycle by either the first cache bank or a bus repeater, is received at a next repeater or the central location before a next clock cycle.

6. The cache of claim 5 wherein the means further comprises:
    at least one staging device associated with the second cache bank to provide a synchronous delay to data output on the first bus from the second cache bank.

7. The cache of claim 6 wherein the second cache bank comprises a nearest cache bank to the central location, and the synchronous delay comprises N−1 clock cycles.

8. The cache of claim 1 wherein the predetermined time comprises a latency that remains constant for each data request of the processor to the cache.

9. The cache of claim 1 wherein the cache comprises a third level cache of a cache hierarchy associated with the processor.

10. A method of accessing data stored in a cache, comprising:
    issuing first and second data requests by a processor core to the cache in a first pair of consecutive clock cycles, the processor core being fabricated on a single die with the cache;
    accessing first and second banks in the cache responsive to the first and second data requests, respectively, the first and second banks having a physical relationship to the processor core;
    returning to the processor core in a second pair of consecutive clock cycles data from the first bank followed by data from the second bank, so that data from the first and second banks is returned to the processor in a predetermined number of clock cycles regardless of the physical relationship.

11. The method of claim 10 wherein the predetermined number of clock cycles comprises a function of an operating frequency of the processor and a distance between a nearest and a farthest bank in the cache relative to a central location on the single die that provides a point for information transfer between the processor core and the cache.

12. The method of claim 11 wherein the first bank is the farthest bank and the second bank is the nearest bank.

13. The method of claim 10 further comprising:
    staging the return of data from the second bank using one or more clocked devices.

14. The method of claim 13 wherein the one or more clocked devices comprise flip-flops.

15. A cache fabricated on a die with a processor comprising:
    a plurality of cache banks, each containing a plurality of storage cell subarrays, the cache banks being arranged in physical relationship to a central location on the die that provides a point for information transfer between the processor and the cache;
    a data path to provide synchronous transmission of data to/from the cache banks such that data requested by the processor in a given clock cycle is received at the central location a predetermined number of clock cycles later regardless of which cache bank in the cache the data is stored.

16. The cache of claim 15 wherein the data path comprises a first data bus to transmit the output data from the cache banks to the central location.

17. The cache of claim 16 wherein the data path further comprises a second data bus to transmit input data from the central location to the cache banks.

18. The cache of claim 16 wherein the physical relationship is such that a first cache bank is located a farthest distance from the central location, and a second cache bank is located a nearer distance to the central location.

19. The cache of claim 18 wherein the data path further comprises:
    N bus repeaters, where N is an integer greater than or equal to one, each of the N bus repeaters operating synchronous with the processor core and being spaced on the first bus such that data accessed from the first cache bank, which is sent on the first bus in a first clock cycle by either the first cache bank or a bus repeater, is received at a next repeater or the central location before a next clock cycle.

20. The cache of claim 19 wherein the data path further comprises:
at least one staging device associated with the second cache bank to provide a synchronous delay to data output on the first bus from the second cache bank.

21. The cache of claim 20 wherein the second cache bank comprises a nearest cache bank to the central location, and the synchronous delay comprises N−1 clock cycles.

22. The cache of claim 15 wherein the predetermined number of clock cycles comprises a latency that remains constant for each data request of the processor core to the cache.

23. The cache of claim 15 wherein the cache comprises a third level cache of a cache hierarchy associated with the processor core.

* * * * *